(12) United States Patent
Fukuda et al.

(10) Patent No.: US 9,981,221 B2
(45) Date of Patent: May 29, 2018

(54) GAS SEPARATION SYSTEM AND ENRICHED GAS PRODUCTION METHOD

(71) Applicant: Ube Industries, Ltd., Yamaguchi (JP)

(72) Inventors: Nobuhiko Fukuda, Yamaguchi (JP); Tomohide Nakamura, Yamaguchi (JP)

(73) Assignee: UBE INDUSTRIES, LTD., Yamaguchi (JP)

( * ) Notice: Subject to any disclaimer, the term of this patent is extended or adjusted under 35 U.S.C. 154(b) by 173 days.

(21) Appl. No.: 15/079,649

(22) Filed: Mar. 24, 2016

(65) Prior Publication Data

US 2016/0288047 A1 Oct. 6, 2016

(30) Foreign Application Priority Data

Mar. 30, 2015 (JP) .................. 2015-068223
Mar. 30, 2015 (JP) .................. 2015-068224

(51) Int. Cl.
*B01D 53/22* (2006.01)
*B01D 63/02* (2006.01)

(52) U.S. Cl.
CPC .......... *B01D 53/226* (2013.01); *B01D 53/22* (2013.01); *B01D 53/227* (2013.01); *B01D 63/02* (2013.01); *B01D 2053/221* (2013.01); *B01D 2256/245* (2013.01); *B01D 2257/504* (2013.01); *B01D 2258/05* (2013.01); *B01D 2313/24* (2013.01); *B01D 2317/027* (2013.01); *Y02C 10/10* (2013.01)

(58) Field of Classification Search
CPC .. Y02C 10/10; B01D 2258/05; B01D 53/227; B01D 53/226; B01D 2313/24; B01D 53/22; B01D 2256/245; B01D 2257/504; B01D 2053/221; B01D 2317/027; B01D 63/02

See application file for complete search history.

(56) References Cited

U.S. PATENT DOCUMENTS

| | | | | |
|---|---|---|---|---|
| 2,923,751 | A * | 2/1960 | Binning | B01D 61/364 208/133 |
| 3,795,317 | A * | 3/1974 | Van Zon | B01D 61/08 210/321.87 |
| 4,198,293 | A * | 4/1980 | Ogawa | B01D 63/06 210/321.69 |
| 4,312,755 | A * | 1/1982 | Hwang | B01D 61/022 210/321.87 |

(Continued)

*Primary Examiner* — Anthony Shumate
(74) *Attorney, Agent, or Firm* — Young & Thompson

(57) ABSTRACT

A gas separation system includes: first, second, and third gas separation membrane units. A first retentate gas line connects a retentate gas discharge port of the first unit and gas inlet port of the second unit. A first permeate gas line connects a permeate gas discharge port of the first unit and gas inlet port of the third unit. A feed gas mixture supply line is connected to a gas inlet port of the first unit, and provided with first compression elements. The first permeate gas line is provided with second compression elements. The permeate gas discharge port of the second unit is connected by a second permeate gas line to the suction side of the first compression elements in the feed gas mixture supply line. A retentate gas discharge port of the third unit is connected by a third retentate gas line to the first retentate gas line.

8 Claims, 2 Drawing Sheets

(56) References Cited

U.S. PATENT DOCUMENTS

| | | | | |
|---|---|---|---|---|
| 4,476,015 A * | 10/1984 | Schmitt | B01D 61/022 | 210/321.83 |
| 5,447,555 A * | 9/1995 | Ye | B01D 53/225 | 95/54 |
| 9,770,687 B2 * | 9/2017 | Ungerank | C10L 3/104 | |
| 2005/0067341 A1 * | 3/2005 | Green | B01D 61/022 | 210/321.69 |
| 2007/0125537 A1 * | 6/2007 | Lokhandwala | B01D 53/22 | 166/291 |
| 2007/0173670 A1 * | 7/2007 | Rix | B01D 61/362 | 568/671 |
| 2010/0320148 A1 * | 12/2010 | Yukumoto | B01D 61/362 | 210/641 |
| 2011/0305310 A1 * | 12/2011 | Sanchez | B01D 53/226 | 376/383 |
| 2012/0000355 A1 * | 1/2012 | Sharma | B01D 53/226 | 95/12 |
| 2012/0322646 A1 * | 12/2012 | Liu | B01J 20/267 | 502/4 |
| 2013/0098242 A1 | 4/2013 | Ungerank et al. | | |
| 2013/0146514 A1 * | 6/2013 | Reeves | B01D 61/022 | 210/106 |
| 2013/0333354 A1 * | 12/2013 | Hamad | B01D 53/22 | 60/274 |
| 2014/0054218 A1 * | 2/2014 | Sprenkel | B01D 61/022 | 210/636 |
| 2014/0295525 A1 * | 10/2014 | Kurihara | C12M 21/14 | 435/209 |
| 2014/0360941 A1 * | 12/2014 | Kitamura | B01D 61/022 | 210/652 |
| 2015/0076063 A1 * | 3/2015 | Ish-Am | C02F 1/44 | 210/636 |
| 2015/0299596 A1 * | 10/2015 | Sethna | B01D 53/226 | 95/50 |
| 2015/0336046 A1 * | 11/2015 | Ungerank | B01D 53/22 | 95/8 |
| 2016/0023164 A1 * | 1/2016 | Karode | B01D 65/003 | 96/8 |
| 2016/0136577 A1 * | 5/2016 | McGovern | B01D 61/12 | 210/652 |
| 2016/0158703 A1 * | 6/2016 | Priske | B01D 61/022 | 568/454 |
| 2016/0346727 A1 * | 12/2016 | Yeo | B01D 53/226 | |
| 2017/0173520 A1 * | 6/2017 | Acharya | B01D 53/229 | |
| 2017/0304769 A1 * | 10/2017 | Bigeard | B01D 53/229 | |

* cited by examiner

[Fig. 1]
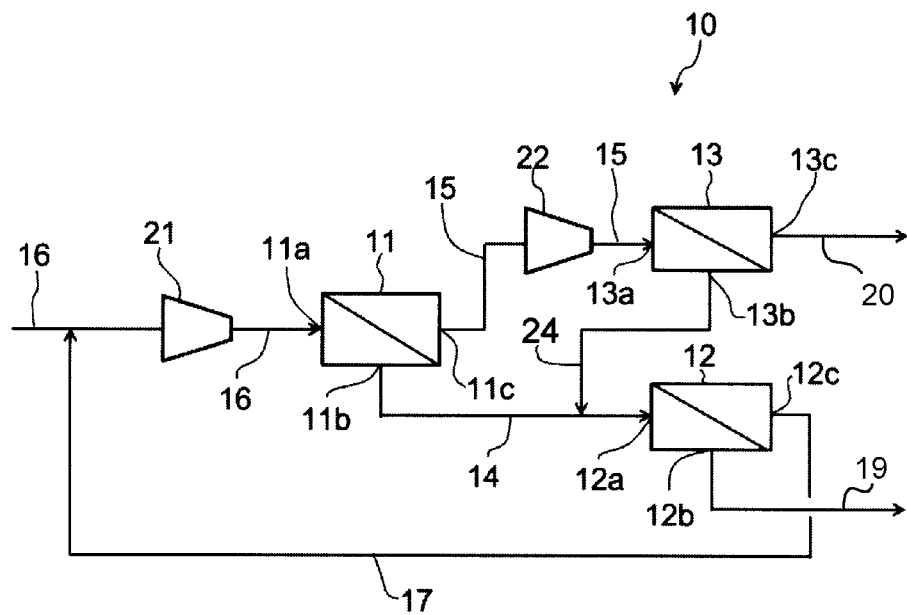
[Fig. 2]
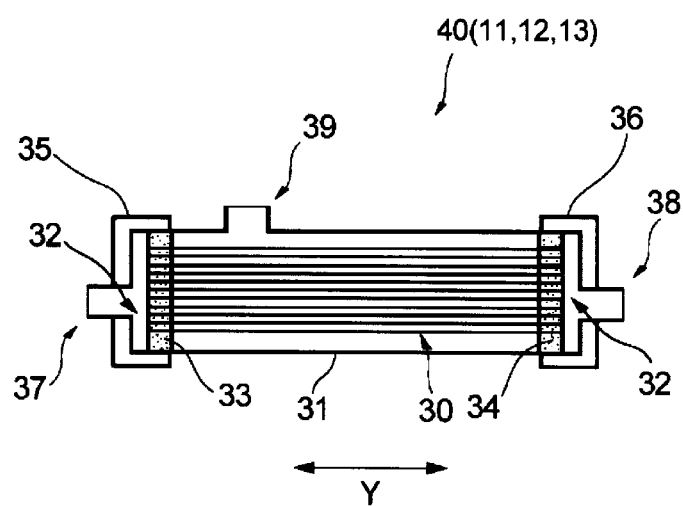

[Fig.3]
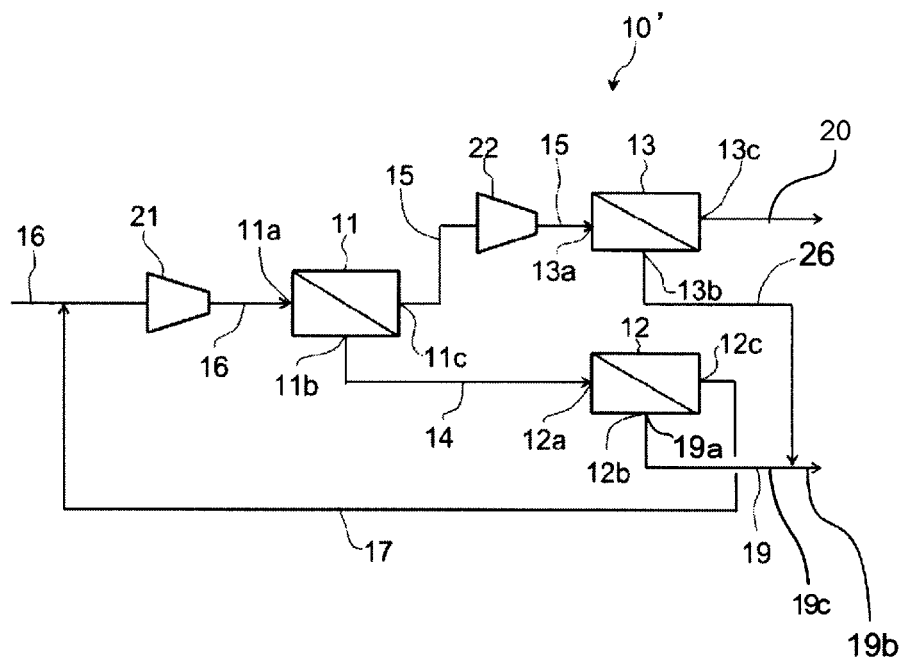
[Fig.4]
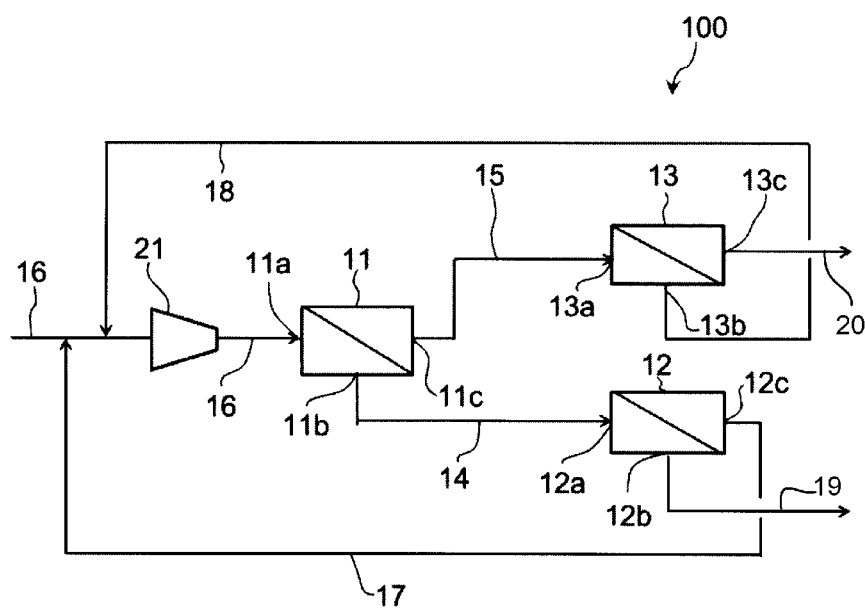

GAS SEPARATION SYSTEM AND ENRICHED GAS PRODUCTION METHOD

TECHNICAL FIELD

The present invention relates to a gas separation system for separating a gas mixture using a plurality of gas separation membrane units and an enriched gas production method using the gas separation system.

BACKGROUND ART

A membrane separation technique, which makes use of the difference in permeability of membranes to different gases, is known for separating a gas mixture containing at least two different gas species into the individual gas species. According to this method, the permeate gas or the retentate gas can be recovered to give a target gas either as a high purity, high-permeability gas or a high purity, low-permeability gas.

The permeability of a membrane, which is the volume of permeation, through the membrane, of each gas contained in the gas mixture per unit membrane area, per unit time, and per unit partial pressure difference, can be expressed as P' (unit: $\times 10^{-5}$ $cm^3(STP)/cm^2 \cdot sec \cdot cmHg$). The gas selectivity of a membrane can be expressed in terms of the ratio of the permeability to the high-permeability gas to the permeability to the low-permeability gas (i.e., permeability to high-permeability gas/permeability to low-permeability gas).

Generally speaking, a membrane with high gas selectivity has a low gas permeability (particularly to a high-permeability gas), and conversely, a membrane with a high gas permeability (particularly to a high-permeability gas) has a low gas selectivity. Thus, in the case of recovering a low-permeability gas from a gas mixture by using a single-stage gas separation membrane, the use of a membrane with high gas selectivity achieves a high recovery rate if the purity of the gas to be recovered is constant. In that case, however, seeing that the permeability is low, it is necessary to increase the membrane area or increase the operating pressure. Although a membrane having a high-permeability, on the other hand, does not require an increase in membrane area or an increase in operating pressure, the achievable recovery rate is low because of the low gas selectivity.

In general, a gas separation membrane is used as incorporated in a gas separation membrane module wherein the gas separation membrane having gas permselectivity is housed in a casing having at least a gas inlet port, a permeate gas discharge port, and a retentate gas discharge port. The gas separation membrane is mounted in the casing in a manner such that the space on the gas feed side and the space on the gas permeation side are separated from each other. In order to obtain a predetermined membrane area, a gas separation system usually includes a gas separation membrane unit having a plurality of such gas separation membrane modules combined in parallel. The plurality of gas separation membrane modules constituting the gas separation membrane unit share the gas inlet port, the retentate gas discharge port, and the permeate gas discharge port, and thus, the gas separation membrane unit functions substantially as a single gas separation membrane module having a large membrane area.

A multi-stage gas separation system including a plurality of gas separation membrane units is known for recovering, as a target gas, low-permeability gas with high purity at a high recovery rate. When a membrane having a high gas permeability is used, the amount of the gas flowing in the system increases due to the low gas selectivity. In that case, the power consumption for gas compression increases in order to maintain desired purity and recovery rate. In the case of using a membrane having high gas selectivity, although the gas compression power reduces, the membrane area should be increased on account of the low permeability to a high-permeability gas.

As regards multi-stage gas separation membrane units, Patent Document 1 below, for example, proposes a gas separation method using three gas separation membrane units. According to this method, a gas mixture to be separated is fed to a gas compressor, from which a compressed gas mixture is fed to a first gas separation membrane unit, and the retentate gas discharged from the first gas separation membrane unit is fed to a second gas separation membrane unit, while sending the permeate gas discharged from the first gas separation membrane unit to a third gas separation membrane unit. The permeate gas discharged from the second gas separation membrane unit and the retentate gas discharged from the third gas separation membrane unit are returned to the suction side of the compressor.

CITATION LIST

Patent Document

Patent Document 1: US 2013/0098242A1

SUMMARY OF THE INVENTION

Problem to be Solved by the Invention

The technique disclosed in Patent Document 1 has the following disadvantages on account of the lack of a second compression means. Because the third gas separation membrane unit operates at a relatively low pressure, it is necessary to secure an increased membrane area of the third gas separation membrane unit by, for example, increasing the number of the membrane modules in order to recover a gas of prescribed purity. Further, with respect to a recirculation system, because the retentate gas from the third gas separation membrane unit has to be returned to the suction side of the compressor no matter how low the pressure is, the power required for compression increases. Furthermore, the total membrane area required of the system is large, which must be achieved by, for example, increasing the number of membrane modules.

An object of the invention is to provide a gas separation system freed from the disadvantages of the aforementioned conventional art.

Means for Solving the Problem

As a result of diligent researches to solve the above problem, the inventors have found that in a gas separation device having three gas separation membrane units, the third gas separation membrane unit operates at a relatively high pressure thereby to reduce the total compression power consumed by the system and to reduce the total membrane area of the system, for example, to reduce the number of membrane modules of the system, by compressing the permeate gas discharged from the first gas separation membrane unit before being fed to the third gas separation membrane unit and returning or joining the retentate gas from the third gas separation membrane unit to a specific line provided in the system.

Based on the above findings, the invention solves the above described problem by providing
a gas separation system comprising a gas separation membrane unit to which a feed gas mixture containing at least two different gas species is supplied and in which at least one of the gas species contained in the feed gas mixture is enriched, wherein the gas separation membrane unit comprises a first gas separation membrane unit, a second gas separation membrane unit, and a third gas separation membrane unit, each gas separation membrane unit has at least a gas inlet port, a permeate gas discharge port, and a retentate gas discharge port, the retentate gas discharge port of the first gas separation membrane unit and the gas inlet port of the second gas separation membrane unit are connected by a first retentate gas line, the permeate gas discharge port of the first gas separation membrane unit and the gas inlet port of the third gas separation membrane unit are connected by a first permeate gas line, the gas inlet port of the first gas separation membrane unit is connected to a feed gas mixture supply line, the feed gas mixture supply line being provided with a first compression means in the middle thereof, the first permeate gas line is provided with a second compression means in the middle thereof, the permeate gas discharge port of the second gas separation membrane unit is connected by a second permeate gas line to the suction side of the first compression means in the feed gas mixture supply line, the retentate gas discharge port of the third gas separation membrane unit is connected by a third retentate gas line to the first retentate gas line of the first gas separation membrane unit, and the enriched gas is recovered from at least one of the retentate gas discharge port of the second gas separation membrane unit and the permeate gas discharge port of the third gas separation membrane unit.

The invention solves the above described problem by providing
a gas separation system comprising a gas separation membrane unit to which a feed gas mixture containing at least two different gas species is supplied and in which at least one of the gas species contained in the feed gas mixture is enriched, wherein the gas separation membrane unit comprises a first gas separation membrane unit, a second gas separation membrane unit, and a third gas separation membrane unit, each gas separation membrane unit has at least a gas inlet port, a permeate gas discharge port, and a retentate gas discharge port, the retentate gas discharge port of the first gas separation membrane unit and the gas inlet port of the second gas separation membrane unit are connected by a first retentate gas line, the permeate gas discharge port of the first gas separation membrane unit and the gas inlet port of the third gas separation membrane unit are connected by a first permeate gas line, the retentate gas discharge port of the second gas separation membrane unit is connected to a retentate gas discharge line, the retentate gas discharge line having a flow passageway in which the retentate gas discharged from the retentate gas discharge port flows and a line discharge port from which the retentate gas having been discharged from the retentate gas discharge port and flowed in the flow passageway is discharged, the gas inlet port of the first gas separation membrane unit is connected to a feed gas mixture supply line, the feed gas mixture supply line being provided with a first compression means in the middle thereof, the first permeate gas line is provided with a second compression means in the middle thereof, the permeate gas discharge port of the second gas separation membrane unit is connected by a second permeate gas line to the suction side of the first compression means in the feed gas mixture supply line, the retentate gas discharge port of the third gas separation membrane unit is connected by a third retentate gas line to the flow passageway of the retentate gas discharge line of the second gas separation membrane unit, and the enriched gas is recovered from at least one of the line discharge port of the retentate gas discharge line and the permeate gas discharge port of the third gas separation membrane unit.

The present invention also provides
an enriched gas production method wherein a feed gas mixture containing at least two different gas species is supplied to a gas separation system and the gas separation system is operated to produce an enriched gas in which at least one of the gas species contained in the feed gas mixture is enriched, the method comprising:

providing a gas separation system comprising a first gas separation membrane unit, a second gas separation membrane unit, and a third gas separation membrane unit, each of the gas separation membrane units having at least a gas inlet port, a permeate gas discharge port, and a retentate gas discharge port, the retentate gas discharge port of the first gas separation membrane unit and the gas inlet port of the second gas separation membrane unit being connected by a first retentate gas line, the permeate gas discharge port of the first gas separation membrane unit and the gas inlet port of the third gas separation membrane unit being connected by a first permeate gas line, the gas inlet port of the first gas separation membrane unit being connected to a feed gas mixture supply line, the feed gas mixture supply line being provided with a first compression means in the middle thereof, the first permeate gas line being provided with a second compression means in the middle thereof, the permeate gas discharge port of the second gas separation membrane unit being connected by a second permeate gas line to the suction side of the first compression means in the feed gas mixture supply line, and the retentate gas discharge port of the third gas separation membrane unit being connected by a third retentate gas line to the first retentate gas line of the first gas separation membrane unit;

supplying the feed gas mixture to the first gas separation membrane unit through the feed gas mixture supply line; and recovering the enriched gas from at least one of the retentate gas discharge port of the second gas separation membrane unit and the permeate gas discharge port of the third gas separation membrane unit.

The invention further solves the above described problem by providing
an enriched gas production method wherein a feed gas mixture containing at least two different gas species is supplied to a gas separation system and the gas separation system is operated to produce an enriched gas in which at least one of the gas species contained in the feed gas mixture is enriched, the method comprising:

providing a gas separation system comprising a first gas separation membrane unit, a second gas separation membrane unit, and a third gas separation membrane unit, each of the gas separation membrane units having at least a gas inlet port, a permeate gas discharge port, and a retentate gas discharge port, the retentate gas discharge port of the first gas separation membrane unit and the gas inlet port of the second gas separation membrane unit being connected by a first retentate gas line, the permeate gas discharge port of the first gas separation membrane unit and the gas inlet port of the third gas separation membrane unit being connected by a first permeate gas line, the retentate gas discharge port of the second gas separation membrane unit being connected to a retentate gas discharge line, the retentate gas discharge line having a flow passageway in which the retentate gas discharged from the retentate gas discharge port flows and a line discharge port from which the retentate gas having been discharged from the retentate gas discharge port and flowed in the passageway is discharged, the gas inlet port of the first gas separation membrane unit being connected to a feed gas mixture supply line, the feed gas mixture supply line being provided with a first compression means in the middle thereof, the first permeate gas line being provided with a second compression means in the middle thereof, the permeate gas discharge port of the second gas separation membrane unit being connected by a second permeate gas line to the suction side of the first compression means in the feed gas mixture supply line, and the retentate gas discharge port of the third gas separation membrane unit being connected by a third retentate gas line to the flow passageway of the retentate gas discharge line of the second gas separation membrane unit;

supplying the feed gas mixture to the first gas separation membrane unit through the feed gas mixture supply line; and recovering the enriched gas from at least one of the line discharge port of the retentate gas discharge line and the permeate gas discharge port of the third gas separation membrane unit.

Effect of the Invention

According to the invention, a total required membrane area of the entire system, for example, the number of membrane modules can be reduced. With respect to the recirculation system, because the retentate gas discharged from the third gas separation membrane unit has a relatively high pressure, the invention makes it feasible to reduce the requisite compression power of the entire system by returning the retentate gas from the third unit to the first retentate gas line of the first gas separation membrane unit, which line has a relatively high pressure resulting from the passage through the first compression means, or by joining the retentate gas from the third unit to the retentate gas discharge line of the second gas separation membrane unit. In particular, the invention provides the advantage that the operating conditions of the first and second compression means are not so limited. This broadens the choice of the compression means and expands the flexibility of system design. In a preferred embodiment of the invention, the system is designed such that the permeability of the second gas separation membrane unit 12 is higher than that of the third gas separation membrane unit 13 in operation and that the gas selectivity of the third gas separation membrane unit 13 is higher than that of the second gas separation membrane unit 12 in operation. This design permits further reduction of the membrane area, e.g., further reduction of the number of membrane modules, of the second gas separation membrane unit while maintaining a high gas recovery rate.

BRIEF DESCRIPTION OF DRAWINGS

FIG. 1 schematically illustrates the configuration of a gas separation system according to an embodiment of the invention.

FIG. 2 schematically illustrates the structure of a gas separation membrane module that can be used in the gas separation system of the invention.

FIG. 3 schematically illustrates the configuration of a gas separation system according to another embodiment of the invention.

FIG. 4 schematically illustrates the configuration of the gas separation system used in Comparative Examples, which corresponds to the technique disclosed in Patent Document 1.

DESCRIPTION OF EMBODIMENTS

The present invention will be described generally based on its preferred embodiments with reference to the accompanying drawings.

A gas separation system 10 according to a preferred embodiment of the invention and a preferred embodiment of the method of the invention for producing an enriched gas by the use of the gas separation system 10 will be first described with reference to FIGS. 1 and 2. The gas separation system 10 shown in FIG. 1 includes three gas separation membrane units: a first gas separation membrane unit 11, a second gas separation membrane unit 12, and a third gas separation membrane unit 13. Each of the gas units 11, 12, 13 can be, for example, a module 40 having a permselective gas separation membrane 30, e.g., hollow fiber membranes, housed in a casing 31 as shown in FIG. 2. Each gas separation membrane unit 11, 12, 13 used in the embodiment may have at least one gas separation membrane module 40 shown in FIG. 2 or may have a plurality of the modules 40 arranged in parallel. The two opposing surfaces of the casing 31 of the module 40 are open to provide openings 32. It should be noted that these openings 32 are for inserting the gas separation membrane 30 into the casing 31 and are not the openings of the gas separation membrane 30. The gas separation membrane 30 is housed in the casing 31 through the opening 32. In cases where the gas separation membrane 30 is constituted by a hollow fiber membrane bundle, the gas separation membrane 30 is inserted in the casing 31 such that the ends of the hollow fiber membranes as housed in the casting 31 are open in the vicinity of the respective openings 32 of the casing 31.

The gas separation membrane 30 as housed in the casting 31 is fixed to the inner wall of the casing 31 by tube sheets 33, 34 at their respective ends in direction Y, in which the hollow fiber membranes extend. The openings 32 of the casing 31 are closed by respective lids 35, 36. The lid 35 is provided with a gas inlet port 37. The lid 36 is provided with a retentate gas discharge port 38. A gas mixture to be separated is introduced into the module (i.e., the unit) from the gas inlet port 37 of the lid 35. Of the introduced gases, the gas having permeated the gas separation membrane 30 is discharged outside the module (i.e., outside the unit) from a permeate gas discharge port 39 provided in the casing 31. On the other hand, retentate gas that has not permeated the gas separation membrane 30 is discharged outside the module (i.e., outside the unit) from the retentate gas discharge port 38 of the lid 36. In some cases, a purge gas supply port (not shown) may be provided in the casing 31. Although the above explanation is based on the separation membrane module shown in FIG. 2, the present invention is understandably applicable to separation membrane modules of other configurations, such as shell-side feed membrane modules and spiral-wound membrane modules.

Returning to FIG. 1, the first gas separation membrane unit 11 and the second gas separation membrane unit 12 are connected in series as shown. Specifically, the first gas separation membrane unit 11 and the second gas separation membrane unit 12 are connected by connecting the retentate gas discharge port 11b of the first gas separation membrane unit 11 and the gas inlet port 12a of the second gas separation membrane unit 12 by a first retentate gas line 14, which may also be called a retentate gas discharge line 14 or a first retentate gas discharge line 14. As used herein, the ordinal number "first", "second", or "third" that comes before the term "permeate gas line" or "retentate gas line" corresponds to the ordinal number that comes before "gas separation membrane unit 11, 12 or 13" to the discharge port of which the line is connected.

As shown in FIG. 1, the first gas separation membrane unit 11 and the third gas separation membrane unit 13 are connected in series. Specifically, the first gas separation membrane unit 11 and the third gas separation membrane unit 13 are connected by connecting the permeate gas discharge port 11c of the first gas separation membrane unit 11 and the gas inlet port 13a of the third gas separation membrane unit 13 by a first permeate gas line 15, which may also be called "a permeate gas discharge line 15".

To the gas inlet port 11a of the first gas separation membrane unit 11 is connected a feed gas mixture supply line 16 for supplying a feed gas mixture from a gas mixture source (not shown) to the first gas separation membrane unit 11. The feed gas mixture supply line 16 is provided with a first compression means 21 in the middle thereof. The first compression means 21 is provided with the aim of pressurizing the gas mixture supplied from the gas mixture source and also pressurizing the permeate gas discharged from the second gas separation membrane unit 12 before being returned to the first gas separation membrane unit 11.

The gas separation system 10 of the embodiment further includes a second compression means 22 in addition to the first compression means 21. The second compression means 22 is provided in the middle of the first permeate gas line 15. The second compression means 22 is provided with the aim of pressurizing the permeate gas discharged from the permeate gas discharge port 11c of the first gas separation membrane unit 11 and supplying the pressurized permeate gas to the third gas separation membrane unit 13.

The permeate gas discharge port 12c of the second gas separation membrane unit 12 is connected by a second permeate gas line 17 to the suction side of the first compression means 21 in the feed gas mixture supply line 16. On the other hand, the retentate gas discharge port 13b of the third gas separation membrane unit 13 is connected by a third retentate gas line 24 to the first retentate gas line 14 of the first gas separation membrane unit 11. The second permeate gas line 17 may also be called "a permeate gas return line 17", and the third retentate gas line 24 may also be called "a retentate gas return line 24".

The operation of the gas separation system 10 of the embodiment configured as above will be described below. A feed gas mixture to be separated is supplied from the gas mixture source (not shown) to the first gas separation membrane unit 11 through the feed gas mixture supply line 16. Before being introduced into the first gas separation membrane unit 11, the gas mixture is pressurized by the first compression means 21 to increase in pressure. The first compression means 21 may be chosen from those conventionally used in the art. For example, a compressor (compressing machine) can be used.

The gas mixture contains at least two different gas species designated gas A and gas B to be separated. The gas species A and B are not particularly limited. When the gas mixture pressurized by the first compression means 21 is supplied to the first gas separation membrane unit 11, the gas mixture is separated into permeate gas, which is the gas that has permeated the gas separation membrane, and retentate gas, which is the gas that has not permeated the gas separation membrane, due to a difference in permeability of the membrane to different gas species. In the description below, for the sake of convenience, a gas to which the gas separation membrane exhibits high permeability, which is referred to as a high-permeability gas, is designated gas A, whereas a gas to which the gas separation membrane exhibits low permeability, which is referred to as a low-permeability gas, is designated gas B. The retentate gas discharged from the first gas separation membrane unit 11 is a gas having gas B in a higher concentration than the feed gas mixture. The retentate gas is discharged from the retentate gas discharge port 11b of the first gas separation membrane unit 11 and is supplied to the second gas separation membrane unit 12 through the first retentate gas line 14. On the other hand, the permeate gas from the first gas separation membrane unit 11 is a gas having gas A in a higher concentration than the feed gas mixture. The permeate gas is discharged from the permeate gas discharge port 11c of the first gas separation membrane unit 11 and is supplied to the third gas separation membrane unit 13 through the first permeate gas line 15.

Before being introduced into the third gas separation membrane unit 13, the permeate gas discharged from the permeate gas discharge port 11c of the first gas separation membrane unit 11 is pressurized by the second compression means 22 to increase in pressure. The thus pressurized permeate gas is introduced into the third gas separation membrane unit 13, so that the third gas separation membrane unit 13 is operable at a relatively high pressure. As a result, there is provided the advantage that the membrane area of the third gas separation membrane unit 13 is allowed to be reduced by, for example, reducing the number of the modules. For example, when the third gas separation membrane unit 13 is composed of a plurality of hollow fiber membrane modules, such as shown in FIG. 2, in a parallel arrangement, it is possible to reduce the number of the modules to be arranged.

The gas introduced into the third gas separation membrane unit 13, which is gas A-enriched gas, is separated into permeate gas and retentate gas by the unit 13. The permeate gas, in which gas A is further enriched as compared with the gas introduced into the third gas separation membrane unit 13, is recovered from the permeate gas discharge port 13c of the unit 13. The recovery of the permeate gas is conducted through a permeate gas discharge line 20 connected to the permeate gas discharge port 13c, which line may be called "a third permeate gas line 20" or "a third permeate gas discharge line 20". On the other hand, the retentate gas is discharged from the retentate gas discharge port 13b of the third gas separation membrane unit 13 and returned to the first retentate gas line 14 of the first gas separation membrane unit 11 via the third retentate gas line 24 connected to the discharge port 13*b*. The retentate gas has a high pressure as a result of the pressurizing by the second compression means 22 aforementioned. Since the retentate gas is returned to the first retentate gas line 14 of the first gas separation membrane unit 11, which line corresponds to the gas flow with an increased pressure resulting from the pressurizing by the first compression means 21, the amount of gas sucked into the first compression means 21 is allowed to be reduced as compared with a case where the retentate gas is returned to the suction side of the first compression means 21. Therefore, when the first compression means 21 is used in combination with the second compression means 22, there is exhibited an advantageous effect that the required compression power of the first compression means 21 is reduced as compared with a case where the second compression means 22 is not used. More specifically, the total required compression power of the first and second compression means 21, 22 is lower than the required compression power of the first compression means 21 when used alone. The combined use of the second compression means 22 offers an additional advantage that the membrane areas of the first and second gas separation membrane units 11, 12 are allowed to be reduced. Specifically, when the second compression means 22 is not used, the permeate gas from the first gas separation membrane unit 11 must be recovered at a pressure higher than the atmospheric pressure, which lowers the efficiency of the first gas separation membrane unit 11. Furthermore, although the pressure of the permeate gas from the first gas separation membrane unit 11 is higher than the atmospheric pressure, that pressure is only slightly higher than the atmospheric pressure, so that the efficiency of the third gas separation membrane unit 13 also decreases. When the second compression means 22 is not used, therefore, it would be necessary to increase not only the membrane area of the third gas separation membrane unit 13 but also the membrane area of the first gas separation membrane unit 11 and/or that of second gas separation membrane unit 12. The use of the second compression means 22 prevents such inconveniences from occurring and thus makes it feasible to reduce the membrane area of the first gas separation membrane unit 11 and/or that of the second gas separation membrane unit 12 as mentioned above.

On the other hand, the retentate gas discharged from the retentate gas discharge port 11*b* of the first gas separation membrane unit 11 is joined to the retentate gas that has been discharged from the retentate gas discharge port 13*b* of the third gas separation membrane unit 13 and returned through the third retentate gas line 24, and then introduced into the second gas separation membrane unit 12. The gas introduced into the second gas separation membrane unit 12 is separated into permeate gas and retentate gas by the unit 12. The retentate gas is a gas B-enriched gas compared to the gas introduced into the second gas separation membrane unit 12, and recovered from the retentate gas discharge port 12*b* of the unit 12. The recovery of the retentate gas is conducted through, for example, a retentate gas discharge line 19, which may also be called "a second retentate gas line 19", connected to the retentate gas discharge port 12*b*. The permeate gas, on the other hand, is discharged from the permeate gas discharge port 12*c* of the second gas separation membrane unit 12 and returned to the suction side of the first compression means 21 provided in the feed gas mixture supply line 16 via the second permeate gas return line 17 connected to the discharge port 12*c*. The permeate gas thus returned is mixed with the feed gas mixture and then pressurized by the first compression means 21.

As stated above, compared with conventional techniques, e.g., the technique of Patent Document 1 in which only one compression means is used, the gas separation system 10 of the embodiment achieves reduction of required compression power of the compression means, with the target gas purity and recovery rate being equal. The system of the embodiment also achieves reduction of the total membrane area, e.g., the number of membrane modules, as compared with the technique of Patent Document 1.

As discussed, the gas separation system of the invention accomplishes the reduction in required compression power of the compression means compared with a case where the retentate gas discharged from the third gas separation membrane unit is returned to the suction side of the first compression means 21. In addition to this, the following advantage is provided compared with a case where the retentate gas is returned to the discharge side of the first compression means 21.

If the retentate gas is returned to the discharge side of the first compression means 21, the retentate gas discharged from the third gas separation membrane unit, which has been pressurized by the second compression means 22, and the feed gas mixture having been pressurized by the first compression means 21 join together upstream of the first gas separation membrane unit. In order to make the joined gas flow stably in the intended direction without causing, e.g., back-flow, it is necessary that the pressure of the retentate gas to be joined be equal to that of the feed gas mixture. Moreover, the retentate gas having been pressurized by the second compression means 22 decreases in pressure while flowing in the third gas separation membrane unit 13 and the third retentate gas line 24 until it reaches the feed gas mixture supply line 16.

Hence, when the retentate gas discharged from the third gas separation membrane unit is returned not to the first retentate gas line of the first gas separation membrane unit but to the discharge side of the first compression means 21 in the feed gas mixture supply line 16, the first and second compression means should be operated so that the pressure of the retentate gas immediately after being pressurized by the second compression means 22 may be higher than that of the feed gas mixture immediately after being pressurized by the first compression means 21. Such a restriction on the operating conditions of the compression means limits the choice of compression means, which reduces the flexibility of system design.

In contrast, the invention allows the pressure of the gas pressurized by the second compression means 22 to be made equal to or lower than that of the gas pressurized by the first compression means 21, thus improving the flexibility of system design.

The gas separation membrane units 11, 12, 13 used in the gas separation system 10 of the embodiment may be the same or different in operation in gas permeability and/or gas selectivity with respect to the gas to be separated. That is, the gas separation membrane units 11, 12, 13 may have the same or different gas permeability and/or gas selectivity. For example, all the gas separation membrane units 11, 12, and 13 may be the same.

In the case where the gas selectivity differs between the third gas separation membrane unit 13 and the second gas separation membrane unit 12 in operation, it may be higher or lower in the unit 13 than in the unit 12 in operation. The same applies to the relation between the third gas separation membrane unit 13 and the second gas separation membrane unit 12 in terms of gas permeability. Nevertheless, taking into consideration ensured achievement of reduction in membrane area of the second gas separation membrane unit 12 to further reduce the total membrane area of the system while preventing reductions in purity and recovery rate of a target gas, it is preferred that, at least in operation, the gas permeability of the second gas separation membrane unit 12 be higher than that of the third gas separation membrane unit 13 and that the gas selectivity of the third gas separation membrane unit 13 be higher than that of the second gas separation membrane unit 12. Herein, when a passage simply states "in operation", the operation is not limited to a specific operating condition. For example, the statement encompasses, e.g., both cases where the units 11 to 13 operate at different temperatures as will be described and cases where the units 11 to 13 all operate at the same temperature.

As used herein, the term "gas permeability" is the permeability of the membrane to gas A (high-permeability gas), out of the gases A and B contained in the gas mixture, to which the permeability of the second gas separation membrane unit 12 is designed to be increased. In operation, the gas selectivity of the first gas separation membrane unit 11 may be the same as or different from that of the second gas separation membrane unit 12. In the case where the gas selectivity differs between the first and second gas separation membrane units 11, 12, the gas selectivity of the first unit 11 may be higher or lower than that of the second unit 12. In operation, the gas selectivity of the first gas separation membrane unit 11 may be the same as or different from that of the third gas separation membrane unit 13. In the case where the gas selectivity differs between the first and third units 11, 13, the gas selectivity of the first unit 11 may be higher or lower than that of the third unit 13. The same applies to the relationship of the first unit 11 to the second and third units 12, 13 in terms of gas permeability in operation. Nonetheless, when the gas selectivity of the third gas separation membrane unit 13 is made higher than that of the second gas separation membrane unit 12 in operation, it is preferred for reducing the compression power of the first and second compression means 21, 22 that the gas selectivity of the first gas separation membrane unit 11 be higher than that of the second gas separation membrane unit 12, e.g., be equal to or higher than that of the third gas separation membrane unit 13, in operation. When the gas permeability of the second gas separation membrane unit 12 is made higher than that of the third gas separation membrane unit 13 in operation, it is preferred for reducing the membrane area of the first gas separation membrane unit 11 that the gas permeability of the first gas separation membrane unit 11 be higher than that of the third gas separation membrane unit 13, e.g., be equal to or higher than that of the second gas separation membrane unit 12, in operation.

Making a difference in gas permeability and/or gas selectivity between units in operation may be achieved by using different types of gas separation membranes in different units. For example, (1) separation membranes having different chemical compositions may be used; (2) separation membranes that have the same chemical composition but are produced under different conditions (e.g., membrane formation conditions and heat treating temperature) are used; or (3) separation membranes that have the same chemical composition and have been produced under the same conditions but have been treated under different conditions in surface treatment, such as coating.

It is generally known that, even when the same gas separation membranes are used, the gas permeability decreases while gas selectivity increases upon setting the operating temperature to relatively lower temperature, compared to upon setting the operating temperature to relatively higher temperature.

Based on this fact, the operating temperature may be varied between units to increase the gas permeability of the second gas separation membrane unit 12 over that of the third gas separation membrane unit 13 and to increase the gas selectivity of the third gas separation membrane unit 13 over that of the second gas separation membrane unit 12. More specifically, it is preferable for the second gas separation membrane unit 12 to be operated at a higher temperature than the third gas separation membrane unit 13. In that way, even when the same gas separation membranes are used in the second gas separation membrane unit 12 and the third gas separation membrane unit 13, it is possible to achieve the same effects as obtained in using different separation membranes by varying the operating temperature between the units, for example, operating the third gas separation membrane unit at a relatively low temperature. A difference in gas selectivity and/or gas permeability may also be made between the second gas separation membrane unit 12 and the third gas separation membrane unit 13 by using different operating temperatures in different units (units 12, 13) and also employing different types of membranes in different units (units 12, 13). In cases of setting the operating temperature of the second gas separation membrane unit 12 to a higher temperature than that of the third gas separation membrane unit 13, the difference in operating temperature between the second gas separation membrane unit 12 and the third gas separation membrane unit 13 is preferably 5° C. or greater, more preferably 20° C. or greater, and even more preferably 40° C. or greater.

The operating temperature of the first gas separation membrane unit may be the same as or different from that of the second gas separation membrane unit. In the latter case, the operating temperature of the first unit may be higher or lower than that of the second unit. The operating temperature of the first gas separation membrane unit may be the same as or different from that of the third gas separation membrane unit. In the latter case, the operating temperature of the first unit may be higher or lower than that of the third unit. If the operating temperature of the second gas separation membrane unit 12 is set higher than that of the first gas separation membrane unit 11, the range of the difference in operating temperature between the units 11 and 12 may be similar to the range described above as the difference in operating temperature between the second gas separation membrane unit 12 and the third gas separation membrane unit 13. If the operating temperature of the first gas separation membrane unit 11 is set higher than that of the third gas separation membrane unit 13, the range of the difference in operating temperature between the units 11 and 13 may be similar to the range described above as the difference in operating temperature between the second gas separation membrane unit 12 and the third gas separation membrane unit 13.

In general, gas A contained in the gas mixture has a relatively higher rate of permeation than gas B through all the gas separation membrane units 11, 12, 13, while gas B in the gas mixture has a relatively lower rate of permeation than gas A through all the gas separation membrane units 11, 12, 13. As stated earlier, in particular, the embodiment accomplishes effective reduction in membrane area of each gas separation membrane unit, especially of the first gas separation membrane unit 11 while retaining the target gas recovery rate and purity and holding down the compression power by returning the retentate gas of the third gas separation membrane unit 13 to the first retentate gas line 14 of the first gas separation membrane unit 11. In addition to this, when the second gas separation membrane unit 12 exhibits a higher gas permeability than the third gas separation membrane unit 13, the membrane area of the second gas separation membrane unit 12 is reduced more effectively. In that case, the invention achieves more effective reduction of the total membrane area of the gas separation system.

The gas permeability of a membrane is the volume of permeation, through the membrane, of each gas contained in the gas mixture per unit membrane area, per unit time, and per unit partial pressure difference and can be expressed as P' (unit: ×10$^{-5}$ cm$^3$ (STP)/cm$^2$·sec·cmHg). The gas selectivity of a membrane can be expressed in terms of the ratio of the permeability to the high-permeability gas to the permeability to the low-permeability gas.

From the viewpoint of enhancing the effects of the present invention, such as reduction of the membrane area, it is preferred that the ratio of the gas selectivity of the third gas separation membrane unit 13 ($P'_A/P'_B$ (3)) to the gas selectivity of the second gas separation membrane unit 12 ($P'_A/P'_B$ (2)), i.e., ($P'_A/P'_B$ (3))/($P'_A/P'_B$ (2)), in operation be 1.2 or greater, more preferably 1.5 or greater, and even more preferably 2 or greater. From the same viewpoint, it is preferred that the ratio of the gas permeability (permeability to the high-permeability gas A) of the second gas separation membrane unit 12 ($P'_A$ (2)) to the gas permeability (permeability to the high-permeability gas A) of the third gas separation membrane unit (13 $P'_A$ (3)), i.e., $P'_A$ (2)/$P'_A$ (3) in operation be 1.0 or greater, more preferably 1.1 or greater, and even more preferably 1.2 or greater. The gas permeability and gas selectivity ratios in operation may be adjusted to the above described respective lower limits or more by controlling various conditions, including the system operating temperature and the material, surface treating conditions, and heat treating conditions of the separation membranes.

If the gas selectivity of the first gas separation membrane unit 11 ($P'_A/P'_B$ (1)) is set higher than that of the second gas separation membrane unit 12 ($P'_A/P'_B$ (2)), the gas selectivity ratio, ($P'_A/P'_B$ (1))/($P'_A/F_B$ (2)), may be similar to that described above for the ($P'_A/P'_B$ (3))/($P'_A/P'_B$ (2)). If the gas permeability of the first gas separation membrane unit 11 ($P'_A$ (1)) is set lower than that of the second gas separation membrane unit 12 ($P'_A$(2)), the gas permeability ratio ($P'_A$ (2)/$P'_A$ (1)) may be similar to that described above for the $P'_A$ (2)/$P'_A$ (3).

If the gas selectivity of the first gas separation membrane unit 11 ($P'_A/P'_B$ (1)) is set lower than that of the third gas separation membrane unit 13 ($P'_A/P'_B$ (3)), the gas selectivity ratio, ($P'_A/P'_B$ (3))/($P'_A/P'_B$ (1)), may be similar to that described for the ($P'_A/P'_B$ (3))/($P'_A/P'_B$ (2)). If the gas permeability of the first gas separation membrane unit 11 ($P'_A$ (1)) is set higher than that of the third gas separation membrane unit 13 ($P'_A$(3)), the gas permeability ratio ($P'_A$ (1)/$P'_A$ (3)) may be similar to that described above for the $P'_A$ (2)/$P'_A$ (3).

The gas separation membrane to be used in each gas separation membrane unit 11, 12, 13 may be selected as appropriate depending on the gas mixture to be supplied and/or the type of target product gas. Gas separation membranes conventionally used in the art can be used without particular limitation. Examples of useful membrane materials include rubbery polymers, such as silicone resins and polybutadiene resins; glassy polymers, such as polyimides, polyether imides, polyamides, polyamide imides, polysulfones, polycarbonates, and cellulose; and ceramic materials such as zeolite. The gas separation membrane may have any structure, for example, a homogeneous membrane, an asymmetric membrane composed of a homogeneous layer and a porous layer, or a microporous membrane. The gas separation membrane may be housed in the casing in any type of membrane modules, such as plate-and-frame, spiral-wound, or potted hollow fiber. A particularly preferred gas separation membrane is an aromatic polyimide hollow fiber gas separation membrane having an inner diameter of approx. 30 μm to 500 μm and having an asymmetric structure composed of a 10 to 200 nm thick homogeneous layer and a 20 to 200 μm thick porous layer.

A single gas separation membrane unit may have one gas separation membrane module or may have a plurality of gas separation membrane modules. In the latter case, it is preferable that the modules be connected in parallel within the unit. When a plurality of gas separation membrane modules are used in a gas separation membrane unit, the membrane area of the unit is easily adjusted by changing the number of gas separation membrane modules.

The gas mixture to be separated using the gas separation system 10 of the embodiment is not particularly limited as long as it contains two or more gas species. The gas separation system of the embodiment can be suitably used, for example, in a method for separating and recovering methane gas, which is a low-permeability gas, from a biogas mainly containing methane gas and carbon dioxide gas. Methane gas corresponds to gas B, which is the low-permeability gas, and carbon dioxide gas corresponds to gas A, which is the high-permeability gas. In this example, in cases where the separated and recovered methane gas is to be supplied to, e.g., a town gas line, a gas compressor may be provided as a compression means at the retentate gas discharge port 12b of the second gas separation membrane unit 12 to compress the methane gas to high pressures.

A gas separation system 10' according to another embodiment of the invention and an enriched gas production method of the invention using the system 10' will next be described with reference to FIG. 3. The description of this embodiment will generally be confined to the difference from the aforementioned embodiment. Elements that are similar to those of the aforementioned embodiment are identified by the same references, and the description thereof is omitted. Some references are subdivided to identify the corresponding elements used in the aforementioned embodiment in more details, such as a connection 19a, a line discharge port 19b, and a flow passageway 19c.

As shown in FIG. 3, the difference of the gas separation system 10' of this embodiment from the system 10 of the aforementioned embodiment is that the retentate gas discharge port 13b of the third gas separation membrane unit 13 is not connected to the first retentate gas line 14 of the first gas separation membrane unit 11 through the third retentate gas line 24. In the present embodiment, the retentate gas discharge port 13b of the third gas separation membrane unit 13 is connected via a third retentate gas line 26, which may also be called "a retentate gas joining line 26", to the retentate gas discharge line 19 of the second gas separation membrane unit 12. In more detail, the retentate gas discharge line 19 includes a connection 19a at which the line 19 is connected to the retentate gas discharge port 12b of the second gas separation membrane unit 12, a flow passageway 19c in which the retentate gas discharged from the retentate gas discharge port 12b flows, and a line discharge port 19b from which the retentate gas having been discharged from the retentate gas discharge port 12b and flowed in the passageway 19 is discharged. That is, the flow passageway 19c of the retentate gas discharge line 19 is between the connection 19a at the retentate gas discharge port 12b and the line discharge port 19b. In the embodiment shown in FIG. 3, the retentate gas discharge line 19 has the connection 19a at one end thereof and the line discharge port 19b at the other end.

The retentate gas discharge port 13b of the third gas separation membrane unit 13 leads to the flow passageway 19c of the retentate gas discharge line 19, i.e., between the connection 19a and the line discharge 19b, via the third retentate gas line 26.

The gas introduced to the third gas separation membrane unit 13, which is gas A-enriched gas, is separated into permeate gas and retentate gas by the unit 13. The permeate gas, in which gas A is further enriched as compared with the gas introduced to the third gas separation membrane unit 13, is recovered from the permeate gas discharge port 13c of the unit 13. On the other hand, the retentate gas is discharged from the retentate gas discharge port 13b of the third gas separation membrane unit 13 and joined to the flow in the flow passageway 19c of the retentate gas discharge line 19 of the second gas separation membrane unit 12 via the third retentate gas line 26 connected to the discharge port 13b. This retentate gas has a high pressure resulting from the pressurizing by the second compression means 22 described above. Since the retentate gas is joined to the retentate gas line 19 of the second gas separation membrane unit 12, which line corresponds to the gas flow with an increased pressure resulting from the pressurizing by the first compression means 21, the amount of gas sucked into the first compression means 21 is allowed to be reduced as compared with a case where the retentate gas is returned to the suction side of the first compression means 21. Therefore, when the first compression means 21 is used in combination with the second compression means 22, there is exhibited an advantageous effect that the required compression power of the first compression means 21 is reduced as compared with a case where the second compression means 22 is not used. More specifically, the total required compression power of the first and second compression means 21, 22 is lower than the required compression power of the first compression means 21 when used alone. The combined use of the second compression means 22 offers an additional advantage that the membrane areas of the first and second gas separation membrane units 11, 12 are allowed to be reduced. Specifically, when the second compression means 22 is not used, the permeate gas from the first gas separation membrane unit 11 must be recovered at a pressure higher than the atmospheric pressure, which lowers the efficiency of the first gas separation membrane unit 11. Furthermore, although the pressure of the permeate gas from the first gas separation membrane unit 11 is higher than the atmospheric pressure, that pressure is only slightly higher than the atmospheric pressure, so that the efficiency of the third gas separation membrane unit 13 also decreases. When the second compression means 22 is not used, therefore, it would be necessary to increase not only the membrane area of the third gas separation membrane unit 13 but also the membrane area of the first gas separation membrane unit 11 and/or that of second gas separation membrane unit 12. The use of the second compression means 22 prevents such inconveniences from occurring and thus allows for reducing the membrane area of the first gas separation membrane unit 11 and/or that of the second gas separation membrane unit 12.

On the other hand, the retentate gas discharged from the retentate gas discharge port 11b of the first gas separation membrane unit 11 is introduced into the second gas separation membrane unit 12. The gas introduced to the second gas separation membrane unit 12 is separated into permeate gas and retentate gas by the unit 12. The retentate gas, in which gas B is further enriched as compared with the gas introduced to the second gas separation membrane unit 12, is recovered from the retentate gas discharge port 12b of the unit 12 via the retentate gas discharge line 19. The retentate gas discharged from the retentate gas discharge port 12b of the second gas separation membrane unit 12 into the retentate gas discharge line 19 joins the retentate gas having a high pressure discharged from the third gas separation membrane unit 13 in the retentate discharge line 19 and then taken out of the retentate gas discharge line 19 from the line discharge port 19b. On the other hand, the permeate gas is discharged from the permeate gas discharge port 12c of the second gas separation membrane unit 12 and returned through the second permeate gas line 17 connected to the discharge port 12C to the suction side of the first compression means 21 provided in the feed gas mixture supply line 16. The returned permeate gas is mixed with the feed gas mixture and then pressurized by the first compression means 21.

As stated above, similarly to the gas separation system 10 of the aforementioned embodiment, the gas separation system 10' of this embodiment achieves reduction of required compression power of the compression means as compared with conventional techniques, e.g., the technique of Patent Document 1, in which only one compression means is used, with the target gas purity and recovery rate being equal. The system of the this embodiment also achieves reduction of the total membrane area, e.g., the number of membrane modules, as compared with the technique of Patent Document 1. In addition, similarly to the aforementioned embodiment, this embodiment allows to operate the first compression means 21 and the second compression means 22 such that the pressure of the retentate gas immediately after the pressurizing by the second compression means 22 may be approximately equal to or lower the pressure of the feed gas mixture immediately after the pressurizing by the first compression means. This broadens the choice of the compression means, thereby expanding the flexibility of system design.

While the present invention has been described with reference to its preferred embodiments, it should be understood that the invention is not construed as being limited to the foregoing embodiments. For example, while the foregoing embodiments employ gas separation membrane units having potted hollow fiber membrane modules as an example of a gas separation unit, other types of gas separation membrane units may be used as well.

EXAMPLES

The present invention will now be illustrated in greater detail by way of Examples, but understandably, the scope of the present invention is not limited to these Examples.

Examples 1 to 8

A gas mixture containing carbon dioxide and methane was separated using the gas separation system 10 shown in FIG. 1 or the gas separation system 10' shown in FIG. 3. Compressors were used as the first and second compression means 21, 22 in the systems 10, 10'. The pressure, flow rate, and composition of the gas mixture were as shown in Table 1 below. The first to third gas separation membrane units 11, 12, 13 were each made by connecting, in parallel, a plurality of gas separation membrane modules shown in Table 1 (gas separation membrane module A or B). Gas separation membrane modules A and B each have polyimide hollow-fiber membranes housed in a casing, and are different in composition of the polyimide hollow fiber membranes. Table 2 below shows $P'_{CO2}$, $P'_{CH4}$, and $P'_{CO2}/P'_{CH4}$ of the gas separation membrane modules A and B, each measured at an operating temperature of 50° C. In Table 2, $P'_{CO2}$, $P'_{CH4}$, and $P'_{CO2}/P'_{CH4}$ of the gas separation membrane module A' are values of the gas separation membrane module A measured at an operating temperature of 100° C. As is clear from Table 2, the gas separation membrane module A has a higher gas selectivity than the gas separation membrane module B, and the gas separation membrane module B has a higher gas permeability than the gas separation membrane module A. The gas separation membrane module A exhibits a higher gas permeability and a lower gas selectivity when operated at 100° C. (module A') than at 50° C. (module A).

The operating temperature and pressure of each gas separation membrane unit 11, 12, 13 were set to the values indicated in Table 1. The gas mixture was separated under these conditions. The number of modules, the total membrane area, and the compressor power when the methane purity reached 95 mol % and the methane recovery rate reached 99% were recorded in each Examples. In Example 7, however, the methane recovery rate did not exceed 97.1% no matter how the total membrane area and compressor power were increased, so that the minimum number of modules, minimum total membrane area, and minimum compressor power when the methane recovery rate reached 97.1% were taken as the results of Example 7. The results obtained are shown in Table 1.

Comparative Examples 1 to 3

A gas mixture was separated in the same manner as in Example 1, except for using the gas separation system 100 shown in FIG. 4. The number of modules, the total membrane area, and compressor power when the methane purity reached 95 mol % and the methane recovery rate reached 99% were recorded in each Comparative Examples. The results obtained are shown in Table 1. The gas separation system 100 of FIG. 4 corresponds to the technique of Patent Document 1.

TABLE 1

| | | Input | | | | | | | | | |
|---|---|---|---|---|---|---|---|---|---|---|---|
| | | | | | | | | | | Operating Pressure | |
| | | Feed Gas | | | | Operating Temp. | | | 1st Unit | | 2nd Unit |
| | Configuration | Temp. ° C. | Pressure MPaG | Flow Rate Nm3/h | Composition CO2 mol % | Composition CH4 mol % | 1st Unit ° C. | 2nd Unit ° C. | 3rd Unit ° C. | Supply Side MPaG / Permeate Side MPaG | Supply Side MPaG / Permeate Side MPaG |

| | Config. | Temp. ° C. | Pressure MPaG | Flow Rate Nm3/h | CO2 mol % | CH4 mol % | 1st Unit ° C. | 2nd Unit ° C. | 3rd Unit ° C. | 1st Supply MPaG | 1st Permeate MPaG | 2nd Supply MPaG | 2nd Permeate MPaG |
|---|---|---|---|---|---|---|---|---|---|---|---|---|---|
| Example 1 | FIG. 1 | 25 | 0.00 | 300 | 40 | 60 | 50 | 50 | 50 | 0.80 | 0.00 | 0.70 | 0.00 |
| Example 2 | | 25 | 0.00 | 300 | 40 | 60 | 50 | 50 | 50 | 0.80 | 0.00 | 0.70 | 0.00 |
| Example 3 | | 25 | 0.00 | 300 | 40 | 60 | 50 | 50 | 50 | 0.80 | 0.00 | 0.70 | 0.00 |
| Example 4 | | 25 | 0.00 | 300 | 40 | 60 | 50 | 100 | 50 | 0.80 | 0.00 | 0.70 | 0.00 |
| Example 5 | FIG. 3 | 25 | 0.00 | 300 | 40 | 60 | 50 | 50 | 50 | 0.80 | 0.00 | 0.70 | 0.00 |
| Example 6 | | 25 | 0.00 | 300 | 40 | 60 | 50 | 50 | 50 | 0.80 | 0.00 | 0.70 | 0.00 |
| Example 7 | | 25 | 0.00 | 300 | 40 | 60 | 50 | 50 | 50 | 0.80 | 0.00 | 0.70 | 0.00 |
| Example 8 | | 25 | 0.00 | 300 | 40 | 60 | 50 | 100 | 50 | 0.80 | 0.00 | 0.70 | 0.00 |
| Compara. Example 1 | FIG. 4 | 25 | 0.00 | 300 | 40 | 60 | 50 | 50 | 50 | 0.80 | 0.20 | 0.70 | 0.00 |
| Compara. Example 2 | | 25 | 0.00 | 300 | 40 | 60 | 50 | 50 | 50 | 0.80 | 0.30 | 0.70 | 0.00 |
| Compara. Example 3 | | 25 | 0.00 | 300 | 40 | 60 | 50 | 50 | 50 | 0.80 | 0.40 | 0.70 | 0.00 |

| | Input Operating Pressure 3rd Unit | | Output | | | | | | | | | |
|---|---|---|---|---|---|---|---|---|---|---|---|---|
| | | | Membrane Module | | | Number of Modules | | | Total Membrane Area m2 | System Performance CH4 Purity mol % | System Performance CH4 Recovery Rate % | Compressor Power 1st Compression Means kW | Compressor Power 2nd Compression Means kW |

| | 3rd Supply Side MPaG | 3rd Permeate Side MPaG | 1st Unit | 2nd Unit | 3rd Unit | 1st Unit | 2nd Unit | 3rd Unit | Area m2 | Purity mol % | Recovery Rate % | 1st kW | 2nd kW |
|---|---|---|---|---|---|---|---|---|---|---|---|---|---|
| Example 1 | 0.80 | 0.00 | A | A | A | 25 | 88 | 9 | 1342 | 95.1 | 99.2 | 45.8 | 12.6 |
| Example 2 | 0.80 | 0.00 | A | B | A | 25 | 30 | 9 | 704 | 95.4 | 99.2 | 52.8 | 12.7 |
| Example 3 | 0.80 | 0.00 | B | B | A | 16 | 33 | 9 | 638 | 95.2 | 99.2 | 58.3 | 23.0 |
| Example 4 | 0.80 | 0.00 | A | A' | A | 25 | 51 | 9 | 935 | 95.1 | 99.2 | 53.5 | 12.6 |
| Example 5 | 0.75 | 0.00 | A | A | A | 23 | 87 | 10 | 1320 | 95.1 | 99.1 | 46.6 | 11.9 |
| Example 6 | 0.75 | 0.00 | A | B | A | 23 | 29 | 10 | 682 | 95.1 | 99.1 | 53.2 | 11.9 |
| Example 7 | 0.75 | 0.00 | B | B | A | 13 | 28 | 16 | 627 | 95.1 | 97.1 | 47.5 | 14.6 |
| Example 8 | 0.75 | 0.00 | A | A' | A | 23 | 51 | 10 | 924 | 95.0 | 99.1 | 54.5 | 11.9 |
| Compara. Example 1 | 0.20 | 0.00 | A | A | A | 43 | 111 | 90 | 2684 | 95.0 | 99.0 | 69.6 | — |

TABLE 1-continued

| | | | | | | | | | | | | | |
|---|---|---|---|---|---|---|---|---|---|---|---|---|---|
| Compara. Example 2 | 0.30 | 0.00 | A | A | A | 48 | 120 | 37 | 2255 | 95.0 | 99.0 | 76.9 | — |
| Compara. Example 3 | 0.40 | 0.00 | A | A | A | 55 | 137 | 23 | 2365 | 95.0 | 99.1 | 100.1 | — |

TABLE 2

| Type of gas separation membrane module | P'CO2 | P'CH4 | P'CO2/ P'CH4 | Membrane area per single module m$^2$ |
|---|---|---|---|---|
| A | 8 | 0.3 | 27 | 11 |
| A' | 11 | 1.0 | 11 | 11 |
| B | 20 | 1.6 | 13 | 11 |

P'CO2 indicates carbon dioxide gas permeability (unit: ×10$^{-5}$ cm$^3$ (STP)/cm$^2$ · sec · cmHg)
P'CH4 indicates methane gas permeability (unit: ×10$^{-5}$ cm$^3$ (STP)/cm$^2$ · sec · cmHg)
P'CO2/P'CH4 indicates gas selectivity As is apparent from the results in Table 1, the gas separation systems of Examples achieve not only reduction of total membrane area but also reduction of requisite compression power of the first compression means 21 and the total compression power of the system compared with Comparative Examples 1 to 3. It is seen, in particular, from comparison between Example 1 and Examples 2, 3, and 4 that the systems of Examples 2, 3, and 4, in which the second gas separation membrane unit 12 has a higher gas permeability than the third gas separation membrane unit 13 while the third gas separation membrane unit 13 has a higher gas selectivity than the second gas separation membrane unit 12 in operation, are capable of achieving further reduction of total membrane area while maintaining a high methane recovery rate as compared with the system of Example 1, in which the second and third gas separation membrane units 12, 13 have the same gas permeability and gas selectivity in operation. Likewise, it is also seen from comparison between Example 5 and Examples 6, 7, and 8 that the systems of Examples 6, 7, and 8, in which the second gas separation membrane unit 12 has a higher gas permeability than the third gas separation membrane unit 13 while the third gas separation membrane unit 13 has a higher gas selectivity than the second gas separation membrane unit 12 in operation, succeed in further reducing the total membrane area while retaining the methane recovery rate on a certain level, i.e., 97.1% or higher, compared with Example 5, in which the second and third gas separation membrane units 12, 13 have the same gas permeability and gas selectivity in operation.

REFERENCE SIGNS LIST

10, 10', 100: Gas separation system
11: First gas separation membrane unit
  11a: Gas inlet port
  11b: Retentate gas discharge port
  11c: Permeate gas discharge port
12: Second gas separation membrane unit
  12a: Gas inlet port
  12b: Retentate gas discharge port
  12c: Permeate gas discharge port
13: Third gas separation membrane unit
  13a: Gas inlet port
  13b: Retentate gas discharge port
  13c: Permeate gas discharge port
14: First retentate gas line
15: First permeate gas line
16: Feed gas mixture supply line
17: Second permeate gas line
18, 24, 26: Third retentate gas line
19: Retentate gas discharge line (second retentate gas line)
  19a: Connection
  19b: Line discharge port
  19c: Flow passageway
20: Permeate gas discharge line (third permeate gas line)
21: First compression means
22: Second compression means
30: Gas separation membrane
31: Casing
32: Opening
33, 34: Tube sheet
35, 36: Lid
37: Gas inlet port
38: Retentate gas discharge port
39: Permeate gas discharge port
40: Gas separation membrane module

The invention claimed is:

1. A gas separation system comprising a gas separation membrane unit to which a feed gas mixture containing at least two different gas species is supplied and in which at least one of the gas species contained in the feed gas mixture is enriched, wherein
the gas separation membrane unit comprises a first gas separation membrane unit, a second gas separation membrane unit, and a third gas separation membrane unit,
each gas separation membrane unit has at least a gas inlet port, a permeate gas discharge port, and a retentate gas discharge port,
the retentate gas discharge port of the first gas separation membrane unit and the gas inlet port of the second gas separation membrane unit are connected by a first retentate gas line,
the permeate gas discharge port of the first gas separation membrane unit and the gas inlet port of the third gas separation membrane unit are connected by a first permeate gas line,
the gas inlet port of the first gas separation membrane unit is connected to a feed gas mixture supply line, the feed gas mixture supply line being provided with a first compression means in the middle thereof,
the first permeate gas line is provided with a second compression means in the middle thereof,
the permeate gas discharge port of the second gas separation membrane unit is connected by a second permeate gas line to the suction side of the first compression means in the feed gas mixture supply line,
the retentate gas discharge port of the third gas separation membrane unit is connected by a third retentate gas line to the first retentate gas line of the first gas separation membrane unit, and
the enriched gas is recovered from at least one of the retentate gas discharge port of the second gas separation membrane unit and the permeate gas discharge port of the third gas separation membrane unit.

2. The gas separation system according to claim 1, wherein, at least in operation, the gas permeability of the second gas separation membrane unit is higher than that of the third gas separation membrane unit, and the gas selectivity of the third gas separation membrane unit is higher than that of the second gas separation membrane unit.

3. The gas separation system according to claim 2, wherein the higher gas permeability of the second gas separation membrane unit than of the third gas separation membrane unit and the higher gas selectivity of the third gas separation membrane unit than of the second gas separation membrane unit are achieved by setting the operating temperature of the second gas separation membrane unit higher than that of the third gas separation membrane unit.

4. The gas separation system according to claim 2, wherein the higher gas permeability of the second gas separation membrane unit than of the third gas separation membrane unit and the higher gas selectivity of the third gas separation membrane unit than of the second gas separation membrane unit are achieved by using different types of gas separation membranes for the second gas separation membrane unit and for the third gas separation membrane unit.

5. An enriched gas production method wherein a feed gas mixture containing at least two different gas species is supplied to a gas separation system and the gas separation system is operated to produce an enriched gas in which at least one of the gas species contained in the feed gas mixture is enriched, the method comprising:

providing a gas separation system comprising a first gas separation membrane unit, a second gas separation membrane unit, and a third gas separation membrane unit, each of the gas separation membrane units having at least a gas inlet port, a permeate gas discharge port, and a retentate gas discharge port, the retentate gas discharge port of the first gas separation membrane unit and the gas inlet port of the second gas separation membrane unit being connected by a first retentate gas line, the permeate gas discharge port of the first gas separation membrane unit and the gas inlet port of the third gas separation membrane unit being connected by a first permeate gas line, the gas inlet port of the first gas separation membrane unit being connected to a feed gas mixture supply line, the feed gas mixture supply line being provided with a first compression means in the middle thereof, the first permeate gas line being provided with a second compression means in the middle thereof, the permeate gas discharge port of the second gas separation membrane unit being connected by a second permeate gas line to the suction side of the first compression means in the feed gas mixture supply line, and the retentate gas discharge port of the third gas separation membrane unit being connected by a third retentate gas line to the first retentate gas line of the first gas separation membrane unit;

supplying the feed gas mixture to the first gas separation membrane unit through the feed gas mixture supply line; and recovering the enriched gas from at least one of the retentate gas discharge port of the second gas separation membrane unit and the permeate gas discharge port of the third gas separation membrane unit.

6. The enriched gas production method according to claim 5, wherein the gas separation system is operated under conditions such that the gas permeability of the second gas separation membrane unit is higher than that of the third gas separation membrane unit and that the gas selectivity of the third gas separation membrane unit is higher than that of the second gas separation membrane unit.

7. The enriched gas production method according to claim 6, wherein the conditions are such that the operating temperature of the second gas separation membrane unit is higher than that of the third gas separation membrane unit.

8. The enriched gas production method according to claim 6, wherein the conditions are such that the second gas separation membrane unit and the third gas separation membrane unit are different in type of gas membranes used therein.

\* \* \* \* \*